United States Patent Office
3,577,311
Patented May 4, 1971

3,577,311
FLOOR COVER
Richard W. Reiter, Plainfield, and Felix P. Liberti, Totowa Borough, N.J., assignors to National Starch and Chemical Corporation, New York, N.Y.
No Drawing. Filed Aug. 4, 1969, Ser. No. 847,418
Int. Cl. B32b 27/04, 27/08, 27/12; C08f 37/00, 45/04
U.S. Cl. 161—254
4 Claims

ABSTRACT OF THE DISCLOSURE

A flooring sheet including a felt backing layer and an upper surface plastisol layer bonded together with at least one tie-coat binder obtained from compositions which are based on selected copolymers, said copolymers containing moieties derived from vinyl acetate and at least one vinyl ester of an alpha-branched saturated aliphatic monocarboxylic acid.

BACKGROUND OF THE INVENTION

This invention relates to the use of tie-coat binders in the manufacture of flooring sheet goods. In a further aspect it relates to the novel flooring sheet goods thus produced.

The manufacture of flooring sheet goods such as linoleum, resilient plastic sheet flooring and similar floor coverings ordinarily encompasses the lamination of two or more layers of dissimilar materials in order to produce a multilayered composite. A typical two-layered flooring sheet goods construction ordinarily includes an upper or surface layer of a polymeric component comprising a plastisol, e.g. highly plasticized polyvinyl chloride, which is fused onto a lower layer or base of felt backing upon which a tie-coat binder composition has previously been applied. These tie-coat binder compositions serve to fill-in, seal and smooth the porous surface of the felt backing while also providing an adhesive interface between the felt backing and the plastisol surface layer. Moreover, the tie-coat binder composition additionally serves as a barrier which protects the plastisol layer from attack by moisture and dissolved alkaline matter that may seep through the felt backing.

In order to be able to produce high quality flooring sheet goods, it is necessary to utilize tie-coat binders which exhibit several critical properties. For example, it is important that the binder composition should not discolor to any appreciable degree upon aging or exposure to heat. However, of far greater significance is the requirement that the tie-coat binder yield a smooth, moisture and alkali resistant coating upon being applied to the felt backing; the latter coating being one which is capable of displaying good adhesion to the plastisol layer.

Presently available tie-coat binders which include, for example, products based on plasticized polyvinyl acetate; polyvinyl chloride; and, copolymers of vinyl chloride with such monomers as vinyl acetate do not exhibit the above described properties to a maximum degree. For example, tie-coat compositions based on plasticized polyvinyl acetate typically exhibit poor adhesion to the vinyl chloride polymers which often comprise the plastisol layer of flooring sheet goods, and their use is thereby severely limited.

It is, therefore, the principal object of this invention to provide tie-coat binders for use in the manufacture of flooring sheet goods which are alkali and moisture resistant and which display excellent adhesion to the plastisol layer. It is a further object of this invention to provide tie-coat binders which function as moisture barriers in the resulting flooring product and which also are inert to the plasticizers utilized in the plastisol layer.

Other objects and advantages of this invention will be apparent from the following description thereof.

TECHNICAL DISCLOSURE OF THE INVENTION

We have now found that all of the previously described requirements for an effective tie-coat binder composition are met by utilizing tie-coat binders which are based on specified copolymers as described hereinbelow. Thus the resulting tie-coat compositions provide excellent adhesion to both the felt backing and the plastisol layer of the flooring sheet goods. Moreover, they possess a high degree of resistance to both moisture and alkali.

The vinyl acetate copolymers utilized as the base component of the tie-coat binders of this invention comprise random copolymers containing moieties derived from vinyl acetate and at least one vinyl ester of an alpha-branched saturated aliphatic monocarboxylic acid having a minimum of five carbon atoms in the carboxylic acid moiety, said acid having the formula

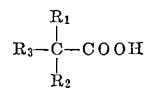

wherein $R_1$ and $R_2$ are alkyl radicals and $R_3$ is a radical selected from the group consisting of hydrogen, alkyl, alkaryl, aralkyl, and aryl radicals. By alpha-branched, we refer to the presence of at least one branch emanating from the carbon atom immediately adjacent to the carboxyl group, such branching being represented by either the $R_1$ or $R_2$ radicals in the above described formula. It is the presence in these vinyl acetate copolymers, of the moieties derived from the latter class of vinyl esters which is primarily responsible for providing the resulting tie-coat binders of this invention with their improved adhesion and alkali resistance.

It should be noted that one may prepare suitable vinyl acetate copolymers using mixtures of two or more of these vinyl esters of alpha-branched saturated aliphatic monocarboxylic acids having a minimum of five carbon atoms in the carboxylic acid moiety. It is also to be noted that vinyl esters of isomer mixtures of the described monocarboxylic acids may likewise be used.

For use in preparing the tie-coat binders of this invention, it is necessary that the selected copolymer contain from about 10 to 90%, by weight, of the above described vinyl ester with optimum results being obtained by the use of copolymers containing from about 30 to 75%, by weight, of the described vinyl ester.

In order to modify certain properties of the resulting copolymers such, for example, as their freeze-thaw stability and self-emulsification characteristics, they may, if desired, be prepared so as to contain one or more additional comonomers. These optional comonomers may include ethylenically unsaturated monocarboxylic acids, such as acrylic, methacrylic, crotonic, and itaconic acids; hydroxyalkyl esters of ethylenically unsaturated monocarboxylic acids, such as hydroxypropyl methacrylate and hydroxyethyl acrylate; aminoalkyl esters of ethylenically unsaturated monocarboxylic acids, such as N,N-diethylaminoethyl acrylate and N,N-diethylaminoethyl methacrylate; alkylol substituted amides of ethylenically unsaturated monocarboxylic acids, such as N-methylol acrylamide and N-methylol methacrylamide; vinyl esters of ethylenically unsaturated monocarboxylic acids, such as vinyl propionate and vinyl crotonate; $C_1$–$C_4$ alkyl half esters of ethylenically unsaturated dicarboxylic acids, such as methyl hydrogen maleate; dialkyl esters of ethylenically unsaturated dicarboxylic acids wherein said alkyl group contains from 1 to about 8 carbon atoms, such as dibutyl maleate; and, allyl esters of aromatic dicarboxylic acids, such as diallyl phthalate. These optional comonomers, or mixtures thereof, may be present in concentrations of not more than about 5%, by weight, based on the total weight of the resulting copolymer.

As for the actual preparation of these copolymers, there may be employed any of the usual aqueous emulsion polymerization procedures which are well known to those skilled in the art and which are particularly suited for the copolymer whose preparation is desired. The resulting emulsions should have a resin solids content of from about 30 to 65%, by weight.

The tie-coat binder compositions utilized in the manufacture of flooring sheet goods according to the process of this invention generally comprise a blend of an inert mineral filler, a dispersant for said filler, and an emulsion copolymer wherein the copolymer utilized is as described hereinabove. They should have a total solids content, i.e. a copolymer resin solids plus filler, of from about 50 to 85%, by weight.

The fillers which are employed in the tie-coat binder compositions of this invention may be selected from among any of the inert mineral pigments commonly used as fillers in such compositions. Mixtures of two or more pigments can also be used. Examples of such pigments include limestone, clay, talc, silica, mica, barytes, zinc oxide, and titanium dioxide. The amount of filler which is used in preparing the tie-coat binder compositions of the present invention can vary from about 200 to 600 parts, by weight, per 100 parts, by weight, of copolymer resin solids. We have found that adhesive compositions having a filler to resin solids ratio of 3 to 1 or 4 to 1 are most effective with respect to the adhesive properties of the resulting binder and are preferred for this reason.

The dispersants which are often employed to disperse the filler in the tie-coat binder compositions of this invention may be selected from among any of a large number of anionic dispersants. Mixtures of two or more dispersants can also be used. Examples of such anionic dispersants include alkali metal phosphates, such as potassium tripolyphosphate, tetrasodium pyrophosphate, tetrapotassium pyrophosphate, and potassium salts of octyl polyphosphoric ester acid; alkali metal salts of polymerized aryl sulfonic acids, such as the sodium salt of polymerized alkyl naphthalene sulfonic acids; alkali metal salts of carboxylated polyelectrolytes, such as the potassium salt of polyacrylic acid; and, ammonium salts of amido polyphosphates. The total concentration of dispersants used in preparing the tie-coat compositions of this invention can range from about 0.5 to 3%, based on the weight of the filler.

It is to be pointed out, however, that although the use of these dispersants provide tie-coat binders which comprise the preferred embodiment of this invention, it is nonetheless possible to prepare suitable tie-coat binders which are completely devoid of such dispersants.

In order to modify certain characteristics of these tie-coat compositions for a particular use, a variety of optional ingredients may be added thereto in a concentration for each class of additive which does not exceed about 3%, as based on the weight of the filler. Illustrative of such optional additives are thickening agents, such as methyl cellulose, hydroxyethyl cellulose, carboxymethyl cellulose, and starch; preservatives, such as phenyl mercuric acetate; plasticizers, such as dibutyl phthalate and alkyl aryl phosphates; and, film fusion agents, such as ethylene glycol monobutyl ether acetate, diethylene glycol monoethyl ether acetate, and hexylene glycol. Coloring agents, wetting and defoaming agents may also be utilized in these compositions if desired.

The actual preparation of these tie-coat binder compositions begins with the preparation of an aqueous slurry or suspension of the filler utilizing the dispersant together with any of the above described optional ingredients. While under agitation, the resulting slurry or suspension is admixed with an aqueous emulsion of the selected vinyl acetate copolymer. Agitation is continued until a homogeneous mixture is obtained. Additional water may then be added in order to adjust the total solids content of the resulting mixture to within the specified limits. It will be appreciated that the sequency utilized for combining the various components is not particularly critical and any desired variations may be utilized.

In using the above described tie-coat binder composition in the manufacture of flooring sheet goods, the binder must first be applied to the felt backing. The binder coating is then dried whereupon the plastisol layer is applied to the thus treated felt backing. Optionally, prior to the application of the plastisol layer, the dried tie-coat binder surface may be printed or otherwise patterned to produce any decorative variations desired in the end product. The resulting two layered composite must then be fused at high temperatures in order to produce the desired flooring product.

The felt backing which is commonly used in preparing such flooring sheet goods comprises a web of cellulosic or asbestos fibers, or of blends of such fibers, which are matted so as to have a final thickness of from about 10 to 40 mils. The method used in applying the tie-coat to the felt backing is not critical and the practitioner can utilize any suitable coating procedure such, for example, as a reverse roller coater or doctor blade technique. The thickness of the tie-coat layer is primarily dependent on such factors as the porosity of the felt backing as well as the amount of filler in the tie-coat. Generally, however, they should be applied so as to obtain a dry film thickness of from about 1 to 5 mils. The thus applied coatings may be dried by the use of any of the drying equipment ordinarily utilized in the industry at temperatures ranging from about 150 to 400° F.

It is next necessary to apply a layer of plastisol onto the surface of the tie-coat binder coating. Plastisols comprise dispersions, in plasticizers, of high molecular weight resin particles having a spherical shape and a small particle size. Examples of resins commonly employed in plastisols used in flooring sheet goods and which are suitable for use in the flooring sheet goods of our invention include polyvinyl chloride and copolymers containing at least about 90%, by weight, of vinyl chloride with one or more of such monomers as vinyl acetate, vinylidene chloride, and the like. The precise amount of comonomer that may be polymerized with the vinyl chloride is not critical as it is only necessary that the resulting copolymer be dispersible, but insoluble at room temperature, in the particular plasticizer which is employed.

The plasticizers which can be employed in preparing the plastisol composition may be chosen from among any of those plasticizing agents generally used with homo- and copolymers of vinyl chloride. These include: diesters of dicarboxylic acids, such as dioctyl azelate, diethylene glycol dipelargonate, diethylene glycol dibenzoate, dibutyl maleate, dioctyl adipate, and dibutyl sebacate; monoesters of aliphatic long chain fatty acids, such as octyl stearate, butyl stearate, butyl oleate and tetrahydrofurfuryl oleate; diesters of dicarboxylic aromatic acids, such as dioctyl phthalate, dicyclohexyl phthalate, and dibutyl phthalate; triesters of tricarboxylic aliphatic acids, such as tributyl citrate, acetyl tributyl citrate, and tributyl aconitate; alkyl aryl phosphate esters, such as tricresyl phosphate; aryl phosphates, such as diphenyl phosphate; diesters of polyethylene glycol, such as polyethylene glycol dibenzoate; alkyl aryl hydrocarbons; epoxidized oils; polymeric epoxy resins derived from the condensation of epihalohydrins with p,p'-isopropylidene diphenol; low molecular weight aliphatic and aromatic petroleum fractions; hydrogenated terphenyls; chlorinated biphenyls; chlorinated paraffins; low molecular weight polyester resins having molecular weights ranging from 1,000 to 10,000; and, glycollate esters, such, for example, as butyl phthalyl butyl glycollate.

The amount of plasticizer which is used in preparing the plastisol can vary from about 30 to about 200 parts, by weight, as based on 100 parts, by weight, of vinyl chloride resin solids.

In addition to the resin and plasticizer components described hereinabove, plastisols may also contain a number of other components in accordance with their method of preparation and desired end-properties. The actual preparation of these plastisols is accomplished by means of procedures which are well known to those skilled in the art and a large variety of plastisols are available commercially.

The procedure to be used in applying the plastisol to the precoated felt backing is not critical and the practitioner may choose from any convenient coating technique for this operation. The plastisols should be applied to the felt backing so as to achieve a dry film thickness of from about 3 to 30 mils. The plastisol coated felt backing must then be heated in order to fuse the plastisol to the backing and thus result in a finished flooring product. The temperatures used in this fusing step should range from about 300 to 500° F. and should be applied for a period of from about 2 to 10 minutes. When the fusing process is completed, the resultant laminate is allowed to cool to room temperature thereby completing its preparation.

Thus, it will be seen that the flooring sheet goods products of this invention are comprised of a lower layer of felt backing which has its upper surface coated with the dried residue of the novel tie-coat composition of this invention upon which is fused a layer of plastisol.

It will be appreciated that numerous variations may be effected in the flooring product of this invention by the application of optional component layers such, for example, as a foam layer and additional clear or pigmented plastisol layers.

The following examples further illustrate the embodiment of this invention. All parts are given by weight unless otherwise indicated.

EXAMPLE I

This example illustrates the preparation of a tie-coat binder composition typical of the products of this invention and further illustrates its use in the manufacture of flooring sheet goods.

A tank equipped with means for mechanical agitation was charged with 13.5 parts of water and 0.5 part of potassium tripolyphosphate. Thereafter, 100 parts of finely divided calcium carbonate was slowly admixed therewith. The resulting mixture was then agitated for a period of about 10 minutes whereupon 46 parts of an aqueous emulsion containing 54%, by weight, of resin solids comprising a (65:35) copolymer of vinyl acetate and a mixture of vinyl esters of isomers of an alpha-branched saturated aliphatic monocarboxylic acid having 10 carbon atoms in the carboxylic acid moiety was admixed therewith over a period of 15 minutes. An additional 13.5 parts of water was slowly added to this composition and agitation was continued until the composition was homogeneous.

The resulting tie-coat composition was applied to a felt backing and the thus-coated backing was then dried for a period of four minutes in a forced-air oven which was maintained at a temperature of about 250° F. The dry thickness of the resulting coating was 3 mils. The thus coated felt backing was thereafter coated with a clear polyvinyl chloride plastisol comprising 100 parts of polyvinyl chloride resin solids dispersed in 50 parts of dioctyl phthalate so as to yield a dry film thickness of 6 mils. The formed composite was then fused by being maintained for five minutes in an oven which was set at a temperature of about 350° F. thereby completing its preparation.

EXAMPLE II

This example illustrates the preparation and use of additional tie-coat compositions which are typical of the novel products of this invention.

Composition A:  Parts
   Water _____ 135
   Potassium salt of polyacrylic acid _____ 6
   Potassium tripolyphosphate _____ 4
   Hydroxyethyl cellulose, 1.5%, by weight, aqueous solution _____ 25
   Titanium dioxide (finely divided) _____ 110
   Calcium carbonate (finely divided) _____ 890
   An aqueous emulsion copolymer as described in Example I, hereinabove _____ 615

Composition B:
   Water _____ 384
   Potassium salt of polyacrylic acid _____ 6
   Potassium tripolyphosphate _____ 4
   Titanium dioxide (finely divided) _____ 110
   Calcium carbonate (finely divided) _____ 890
   An aqueous emulsion copolymer as described in Example I, hereinabove _____ 371

With some slight modifications, the procedure described in Example I, hereinabove, was employed in preparing each of the above described compositions which were then used to coat a felt backing as part of the process of making a flooring sheet goods product. A plastisol comprising 100 parts of polyvinyl chloride resin solids dispersed in 50 parts of dioctyl phthalate was applied to the dried, coated felt backings, and the resulting composites were fused by being heated at 350° F. for a period of 5 minutes. Each of the flooring laminates thus produced exhibited excellent adhesion as well as a minimum of discoloration when subjected to temperatures of 180° F. for a period of 72 hours.

EXAMPLE III

This example illustrates the preparation of a number of additional tie-coat compositions typical of this invention. Each of these compositions was prepared by means of the procedure described in Example I, hereinabove.

Composition A:  Parts
   Water _____ 270
   Potassium salt of polyacrylic acid _____ 6
   Tetrapotassium pyrophosphate _____ 4
   Calcium carbonate (finely divided) _____ 890
   Aqueous emulsion of a (90:10) copolymer of vinyl acetate:vinyl esters of isomers of alpha-branched saturated aliphatic mono-carboxylic acids having 10 carbon atoms in the carboxylic moiety, containing 54%, by weight, of resin solids _____ 485

Composition B:
   Water _____ 270
   Potassium salt of polyacrylic acid _____ 6
   Tetrapotassium pyrophosphate _____ 4
   Titanium dioxide (finely divided) _____ 100
   Calcium carbonate (finely divided) _____ 690
   Clay (finely divided) _____ 200
   Aqueous emulsion of a (25:75) copolymer of vinyl acetate:vinyl esters of isomers of alpha-branched saturated aliphatic monocarboxylic acids having 10 carbon atoms in the carboxylic moiety, containing 54%, by weight, of resin solids _____ 485

Composition C:
   Water _____ 135
   Potassium tripolyphosphate _____ 8
   Clay (finely divided) _____ 100
   Calcium carbonate (finely divided) _____ 450
   Titanium dioxide (finely divided) _____ 450
   Aqueous emulsion of a (63:2:35) terpolymer of vinyl acetate: N-methylol acrylamide:vinyl esters of isomers of alpha-branched saturated aliphatic monocarboxylic acids having 10 carbon atoms in the carboxylic moiety, containing 54%, by weight, of resin solids _____ 615

Composition D: Parts
Water _____ 270
Calcium carbonate (finely divided) _____ 890
An aqueous emulsion copolymer as described in
  Example I, hereinabove _____ 485

Summarizing, it is thus seen that this invention provides for the preparation of improved flooring tie-coat binder compositions and illustrates their use in the manufacture of flooring sheet goods.

Variations may be made in proportions, materials and procedures without departing from the scope of this invention which is defined by the following claims.

We claim:
1. A flooring sheet goods product, the lower layer of which comprises a felt backing having a coating of a tie-coat binder on its upper surface; said tie-coat binder coating comprising the dried consolidated residue of a blend of an inert mineral filler and an aqueous emulsion of a random copolymer containing from about 10 to 90%, by weight, of moieties derived from vinyl acetate together with moieties derived from at least one vinyl ester of an alpha-branched saturated aliphatic monocarboxylic acid having a minimum of 5 carbon atoms in carboxylic acid moiety, said acid having the formula

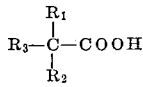

wherein $R_1$ and $R_2$ are alkyl radicals and $R_3$ is a radical selected from the group consisting of hydrogen, alkyl, alkaryl, aralkyl and aryl radicals; said filler being present in a concentration of from about 200 to 600 parts, by weight per 100 parts, by weight, of copolymer resin solids; said flooring sheet goods having as its upper surface a plastisol layer which is in contact with and fused to said tie-coat binder coating.

2. The flooring sheet goods product of claim 1, wherein said random copolymer also contains moieties derived from at least one optional comonomer selected from the group consisting of (a) ethylenically unsaturated monocarboxylic acids, (b) hydroxyalkyl esters of ethylenically unsaturated monocarboxylic acids, (c) aminoalkyl esters of ethylenically unsaturated monocarboxylic acids, (d) alkylol substituted amides of ethylenically unsaturated monocarboxylic acids, (e) vinyl esters of ethylenically unsaturated monocarboxylic acids, (f) $C_1$–$C_4$ alkyl half esters of ethylenically unsaturated dicarboxylic acids, (g) dialkyl esters of ethylenically unsaturated dicarboxylic acids wherein said alkyl group contains from 1 to about 8 carbon atoms, and (h) allyl esters of aromatic dicarboxylic acids; the moieties derived from said optional comonomer being present in a concentration of not more than about 5%, by weight, based on the total weight of the resulting copolymer.

3. The flooring sheet goods product of claim 1 wherein there is also present an anionic dispersant selected from the group consisting of alkali metal phosphates, alkali metal salts of polymerized aryl sulfonic acids, alkali metal salts of carboxylated polyelectrolytes, and ammonium salts of amido polyphosphates; said dispersant being present in a concentration of from about 0.5 to 3 parts, by weight, per 100 parts, by weight, of said inert mineral filler.

4. The flooring sheet goods product of claim 1, wherein said plastisol layer is derived from a dispersion in a plasticizer, of at least one resin selected from the group consisting of polyvinyl chloride and copolymers containing at least about 90%, by weight, of vinyl chloride, said plasticizer being selected from the group consisting of diesters of dicarboxylic acids, monoesters of aliphatic long chain fatty acids, diesters of dicarboxylic aromatic acids, triesters of tricarboxylic aliphatic acids, alkyl aryl phosphate esters, aryl phosphates, diesters of polyethylene glycol, alkyl aryl hydrocarbons, epoxidized oils, polymeric epoxy resins, low molecular weight aliphatic and aromatic petroleum fractions, hydrogenated terphenyls, chlorinated paraffins, low molecular weight polyester resins, and, glycollate esters; the concentration of said plasticizer being from about 30 to 200 parts, by weight, per 100 parts, by weight, of resin solids.

References Cited

UNITED STATES PATENTS 2,774,685  12/1956  Carnegie _____ 161—254X
3,068,118  12/1962  Biskup et al. _____ 161—254X
3,239,364  3/1966  Carlisle et al. _____ 117—9

WILLIAM A. POWELL, Primary Examiner

U.S. Cl. X.R.

117—76; 161—151, 205, 249, 256; 260—41